May 8, 1934.   H. A. RIKE   1,957,867
WELL PUMPING VALVE
Filed May 19, 1932
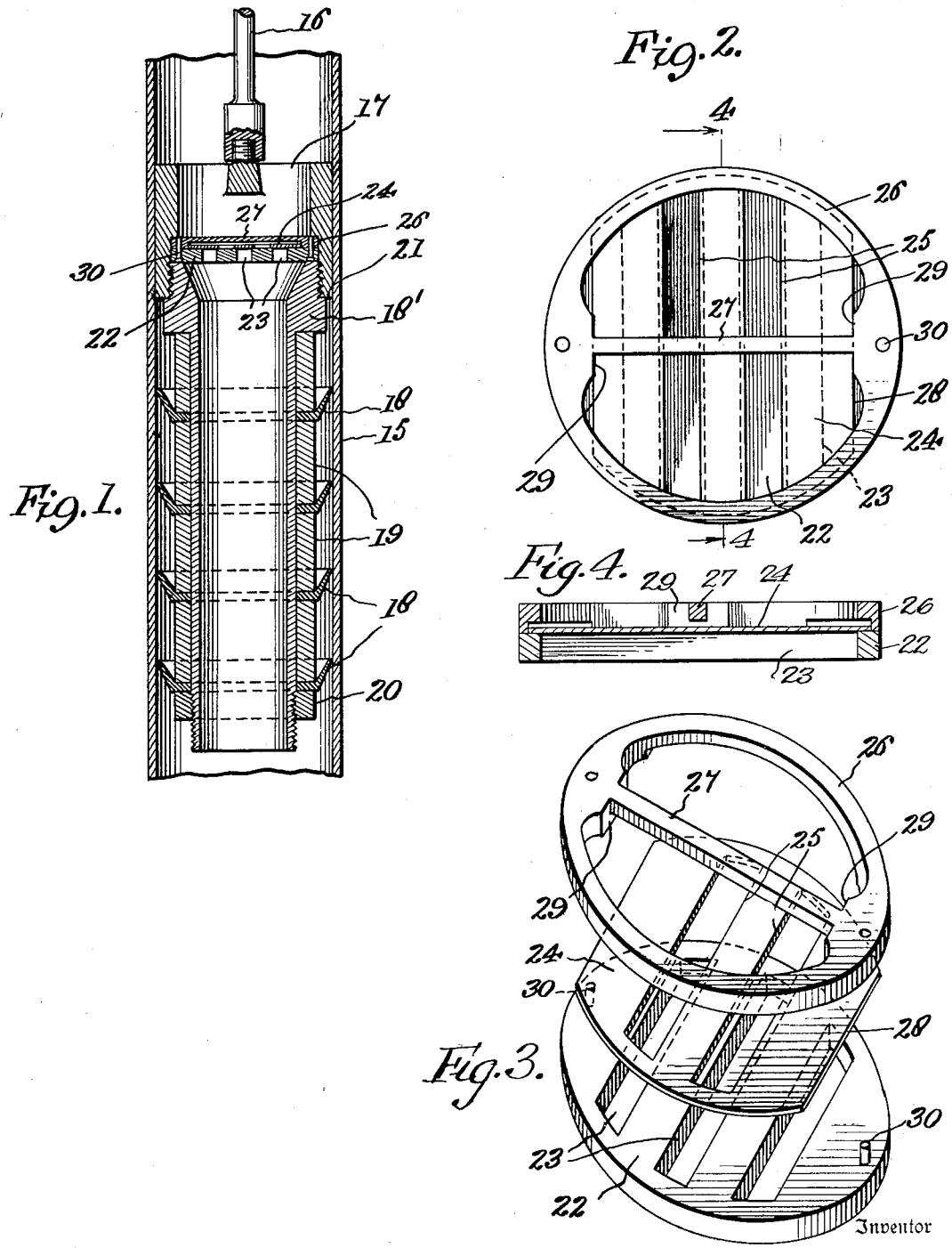
Inventor
Howard A. Rike
By Wilkinson & Mawhinney
Attorneys Patented May 8, 1934

1,957,867

UNITED STATES PATENT OFFICE 1,957,867

WELL PUMPING VALVE

Howard Auther Rike, Norphlet, Ark.

Application May 19, 1932, Serial No. 612,320

2 Claims. (Cl. 251—119)

The present invention relates to valves, adapted particularly to oil wells, fluid pumps and the like where a transfer or the lifting of fluid is effected by the use of the valves.

Numerous valve structures have heretofore been invented for this purpose, particularly in well pumps and an object of the present invention is to provide a valve for this use which is of a novel construction and more efficient and wherein the valve, during the traveling operation, is subjected to the least abuse and wherein the valve is quickly responsive to opening and closing at the ends of the stroke so as to reduce practically to a minimum all loss of effort incident to the change of direction of traveling of the reciprocating part, or the pumping effect produced thereby.

Another object of the present invention is to eliminate the recoil action of the valve and thus prolong the life and efficiency of the valve. In carrying out this object the invention aims to reduce by many hours the unnecessary loss of time in an endeavor to operate the pumping equipment at a maximum and wherein the equipment itself is maintained at a minimum with respect to the work to be performed.

Another object of the present invention is to provide an improved construction of valve wherein the reciprocating or valve element itself may be constructed in the form of a plate, disc or ring which controls a relatively large through port or opening in the valve, and a construction which will not require a great deal of attention and which will not necessitate frequent changes in the valve parts, features which heretofore have produced a relatively great expense in the operation of pumping equipment and which render many valve operations unprofitable which might otherwise be carried on.

A still further object of the invention is to provide a valve structure wherein the valve element itself is of the full floating type and is of sufficient lightness to overcome losses of energy required to lift the valve element.

With the foregoing and other objects in view, the invention will be more fully described hereinafter, and will be more particularly pointed out in the claims appended hereto.

In the drawing, wherein like symbols refer to like or corresponding parts throughout the several views.

Figure 1 is a vertical section taken through the cylinder and piston portion of a well pump, showing a valve constructed according to the present invention mounted in the piston.

Figure 2 is a detail enlarged top plan view of the valve removed from the piston.

Figure 3 is a perspective view of the valve showing three parts of the same in separated and in relative positions.

Figure 4 is a transverse section taken through the valve on the line 4—4 of Figure 2.

Referring now to the drawing, and first to Figure 1, 15 indicates a valve case or cylinder within the upper portion of which is disposed a sucker rod 16 threadedly connected at its lower end to a piston head 17 in the lower end of which is threaded a depending piston shank 18' which is hollow and which communicates with the piston head 17 which is also hollow, as shown in Figure 1. The shank 18' is provided thereabout with a plurality of spaced apart cups or washers 18 which may be of leather or a suitable composition, used in the structures, and which are held in spaced apart relation along shank 18' by means of spacing sleeves or ferrules 19. A foot nut 20 is threaded upon the lower end of the shank 18' for holding the washers 18 and sleeves 19 in proper engagement with one another and about the shank.

The lower end of the piston head 17 is counter-bored and internally threaded near the lower end of the counter-bore, and the shank 18' is shouldered, as at 21, to engage the lower end of the piston head 17 to bind the upper threaded end of the shank in the counter-bore of the piston head, leaving a suitable space between the inner end of the counter-bore and the adjacent end of the shank 18'. Within this annular space is disposed a pumping valve constructed according to the present invention, and shown more in detail in Figures 2, 3 and 4.

The valve comprises a valve seat or base portion 22 which is of disc form to fit in said space above the piston shank 18' and to rest upon the end of the latter. This valve seat is provided with a plurality of transverse slots or openings 23 through which the fluid is adapted to freely pass, and the openings 23 are relatively large, and are in suitable number to provide a relatively large area of port or passage through the valve.

Loosely disposed upon the valve seat 22 is a valve element or disc 24 which is relatively thin, which is provided with a plurality of slots 25 which extend crosswise in the disc 24 and which are engaged in offset relation with respect to the slots 23 of the valve seat so that when the valve element 24 rests flat upon the upper face of the valve seat the slots 25 of the valve element will register with the solid or imperforate portions of the valve seat, and thus effectively close passage through the valve. The slots or ports 23 and 25 are arranged in parallel relation, and the valve element 24 is held from axially turning upon the valve seat 23 by a valve guard 26. The valve guard 26 is adapted to seat directly upon the valve seat and is in the form of a ring which engages near the marginal edge portion of the valve seat 22.

The valve guard 26 is open at its intermediate portion and is provided with a supporting bar 27, or other suitable device adapted to engage the intermediate portion of the valve element 24 to hold the latter against deformation incident to the upward flow of the fluid through the valve. The bar 27 is disposed at right angles with respect to the slots 25 so as to engage across the imperforate bars or strips of which the valve element 24 is composed.

It will be observed from the drawing that the opposite ends of the valve element 24 are provided with flat or straight edges 28 and that these edges 28 freely slide against shoulders or guides 29 which extend inwardly from diametrically opposed points of the valve guard 26, at opposite sides of and beneath the supporting bar 27. The valve element 24 is free to rise bodily through the depth of the guides or shoulders 29 between the upper face of the valve seat 22 and the lower face of the bar 27.

The valve guard 26 may be rigidly secured to the valve seat 22 to hold the parts against relative axial turning, by pins 30, bolts or the like which may engage through the opposite ends of the respective parts, at the opposite ends of the reinforcing or stop bar 27.

The valve thus constructed may be readily clamped in the lower end of the piston head 17 as shown in Figure 1. The valve serves as a separate part or unit which may be readily placed in the piston or removed therefrom by merely uncoupling the head from the shank of the piston. The valve element 24 is relatively light in weight, presents relatively large surface areas at the upper and lower faces of the valve and thus is susceptible to operation by slight pressure and offers practically no resistance to movement during the seating and unseating of the valve. The valve disc or plate 24 is thus of the full floating type and moves bodily toward and from its seat, and may be of sufficient flexibility to accommodate itself to any possible unevenness in the upper face of the valve seat 22. In use of a valve of this particular construction in a well pump, the valve operates quickly and effectively so that there is no lost motion or energy incident to a change in direction of movement of the piston and consequently the full stroke of the piston is obtained in the lifting or transfer of the fluid through the pump cylinder or case 15.

It will also be noted that in this valve there is a relatively large area of port so that the pump structure, whether used in wells or otherwise, may handle relatively large volumes of fluid and may be operated at a relatively high speed.

It is obvious that various changes and modifications may be made in the details of construction and design of the above specifically described embodiment of this invention without departing from the spirit thereof, such changes and modifications being restricted only by the scope of the following claims.

What is claimed is:

1. A well pumping valve comprising a valve disc having a plurality of spaced apart transverse slots therein, a valve guard of ring form seated upon the marginal edge portion of the valve seat and provided with a longitudinal bar within the valve guard and offset outwardly from the valve seat to provide guides on the valve guard at opposite ends of said bar, and a bodily movable valve element of disc form fitting between the valve seat and the valve guard and having straight edges at opposite ends adapted to engage the guide surfaces and adapted for movement toward and from said bar, said valve element having spaced transverse slots therein offset from the slots of the valve seat to register with the imperforate portions of the latter when the valve element is seated to close the valve.

2. A valve comprising an outer casing part internally threaded at one end and having an internal shoulder spaced inwardly from the threaded portion, an inner casing part externally threaded at one end into the threaded end of the outer part and having a stop inwardly of its threads to engage the outer part and determine the relative positions of the casing parts, a base disc seated against the inner end of the inner casing part and having ports therethrough, a stop flange disc seated on the base disc and engaging said internal shoulder of the outer casing part to hold the discs together between the casing parts, said stop flange disc having a recess in its under side and stop means at its upper edge portion, and a valve disc disposed in said recess of the stop flange disc and having ports therein offset from the ports in the base disc and movable in the recess between the base and stop flange discs.

HOWARD AUTHER RIKE.